Sept. 11, 1934.  G. A. MOFFETT  1,973,538
PROTECTIVE EQUIPMENT FOR ELECTRICAL APPARATUS
Filed Oct. 25, 1930
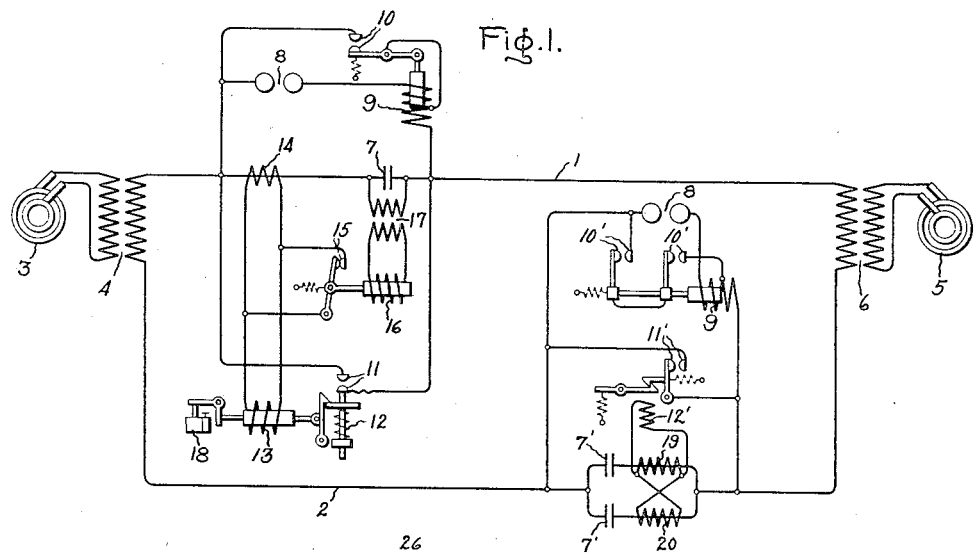
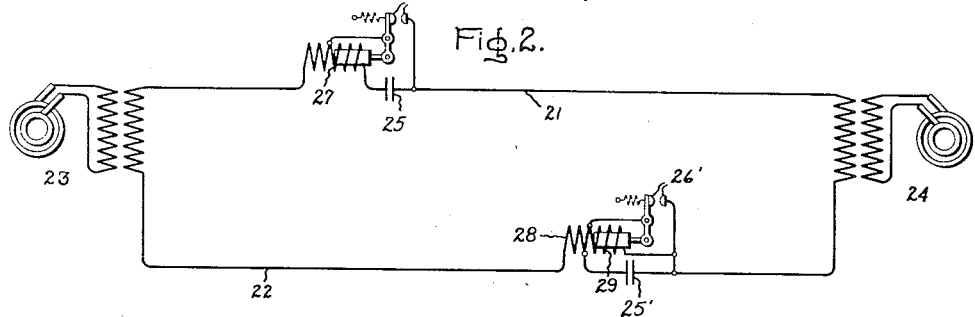
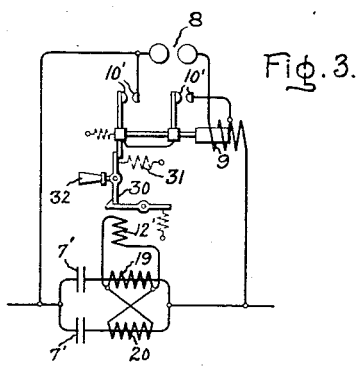
Inventor:
Guy A. Moffett,
by Charles E. Tullar
His Attorney.

Patented Sept. 11, 1934

1,973,538

UNITED STATES PATENT OFFICE 1,973,538

PROTECTIVE EQUIPMENT FOR ELECTRICAL APPARATUS

Guy A. Moffett, Scotia, N. Y., assignor to General Electric Company, a corporation of New York Application October 25, 1930, Serial No. 491,281

10 Claims. (Cl. 175—294)

My invention relates to improvements in protective equipment for electrical apparatus and more particularly to improvements in protective equipment for electrical condensers which are associated with electrical transmission and distribution systems.

It is expected that electrical condensers will be extensively used in the future as adjuncts to alternating current electrical transmission and distribution systems. Series capacitors or condensers inserted in a power carrying electrical circuit improve its voltage regulation by neutralizing the voltage drop in the circuit which is due to the circuit's inductive reactance. In addition to this, series capacitors may also act to substantially neutralize the resistance voltage drop in the circuit if the line as a whole is made capacitive by the insertion of sufficient series capacitance. In this way a substantially flat voltage regulation is secured over a reasonable range of load change. The reason that the latter result may be achieved is because nearly all commercial loads, including private houses, are inductive and hence draw a lagging current through the capacitive circuit with the result that an actual rise in voltage between the source and the load may be produced if desired.

A further advantage of series capacitors is that when they are inserted in synchronous-to-synchronous transmission circuits they materially increase the power limits of such circuits. This is because the power limit of a synchronous-to-synchronous system is a function of the series impedance between the generator and motor and by neutralizing the circuit reactance the series capacitors decrease the effective impedance of the circuit.

Capacitors may also be used as parallel capacitors to improve the power factor of a system.

The capacitors which are used for such purposes have a dielectric which is subject to permanent breakdown if it is overstressed. For this reason it is necessary that these capacitors be provided with protective means which act to relieve them when overvoltage or overcurrent conditions exist. It is also desirable to provide means for taking a capacitor out of service if its dielectric should fail, as from a latent defect for example, for otherwise a destructive arc might be maintained. One such combined overload and dielectric failure protective equipment is described and claimed in United States Letters Patent No. 1,755,095, which issued on April 15, 1930 on an application filed by T. A. E. Belt.

The system described in the above mentioned patent requires an auxiliary source of direct current for its operation. It is therefore not adapted for use in connection with capacitors which are installed at remote and isolated points on a system. Furthermore the system described in the patent is relatively expensive, and as heretofore one of the factors which has retarded the introduction of capacitors has been the cost of the protective equipment it is obvious that it is important that such equipment should be as inexpensive as is compatible with reliability. Furthermore, as impliedly pointed out above it is also desirable that the protective equipment should obtain its operating current from the circuit to which the capacitor is connected.

In accordance with my invention I provide novel and improved protective equipments for capacitors which are adapted respectively for operation on low and high voltage circuits.

An object of my invention is to provide improved, simple and reliable protective equipment for electrical apparatus.

Another object of my invention is to provide protective equipment for capacitors which derives its operating current from the circuit to which the capacitor is connected.

My invention will be better understood from the following description taken in connection with the accompanying drawing and its scope will be pointed out in the appended claims.

In the drawing Fig. 1 illustrates diagrammatically two combined overload and dielectric failure protective equipments for series capacitors which differ primarily in the operating means of the respective dielectric failure protective elements and whose overload protective elements are particularly adapted for use on high voltage circuits; Fig. 2 illustrates two overload protective equipments for series capacitors which are particularly adapted for low or medium voltage circuits; while Fig. 3 illustrates a refinement and simplification of one of the equipments illustrated in Fig. 1.

Referring now to Fig. 1 of the drawing, 1 and 2 are the conductors of what is preferably a high voltage transmission line or circuit which transmits electrical energy between terminal apparatus consisting respectively of a synchronous machine 3 and power transformer 4 at one end and a synchronous machine 5 and power transformer 6 at the other end. It is immaterial to my invention in its broadest aspects whether the machines are synchronous machines or not and they have been so illustrated only because most high voltage transmission systems involve such machines. It is also immaterial in which direction the power flow is in the transmission system illustrated or whether the system is single phase as illustrated or has any other desired number of phases. A series capacitor 7 is connected in conductor 1 and the protective equipment for this capacitor will now be described.

The overload protective apparatus comprises a current limiting impedance or voltage limiting device such as a sphere gap 8 connected across the capacitors through an operating coil 9 of a normally open contactor or switch whose contacts 10 are connected across capacitor 7 through a part only of the operating coil 9.

The dielectric failure protective equipment comprises a normally open switch or contactor having contacts 11 connected across capacitor 7, a biasing means such as spring 12 for urging the contacts 11 closed and a tripping coil 13 which is connected to be energized by the current in conductor 1, as through the current transformer 14 illustrated. Arranged to short circuit tripping coil 13 are a pair of contacts 15 of a contactor whose operating coil 16 is energized in accordance with the voltage across capacitor 7, as by connecting it across the capacitor through a potential transformer 17. The tripping mechanism for contact 11 is preferably provided with a time delayed mechanism comprising a dash pot 18.

The operation of both equipments is as follows: Assume that the transmission circuit including conductors 1 and 2 is operating in a normal manner to transmit energy at substantially constant voltage between its terminal apparatus. Under these conditions no current will flow in the operating coil 9 because under normal conditions on the transmission circuit the voltage across capacitor 7 will not be dangerously high and consequently no discharge will take place across gap 8. Contacts 10 will therefore be open. Operating coil 16 is however arranged to maintain contact 15 closed while there is voltage across capacitor 7. Consequently tripping coil 13 will be short circuited and contacts 11 will be open.

Assume now that an overload or short circuit condition on the transmission circuit causes the current passing through the capacitor 7 to attain an abnormally high value. Such a condition will cause an abnormally high voltage across the capacitors with the result that its dielectric material is likely to be overstressed and eventually break down permanently. In order to quickly check this rise in voltage across capacitor 7 the gap 8 is designed to allow a discharge at a voltage below the critical break down voltage of the capacitor's dielectric. However as the overload or short circuit conditions may last for a considerable time it is very desirable that the gap be protected by short circuiting it as soon as possible for otherwise the heat generated by a continuous arc discharge between the electrodes of the gap may so burn and pit them as to change the voltage calibration of the gap. Therefore, as soon as current flows in the gap circuit the coil 9 will be energized to close contacts 10 thereby to short circuit the capacitor and the gap which extinguishes the arc. The line current will now flow through contacts 10 and but a part of the turns of coil 9. The number of these turns is so selected that they act as a holding coil to maintain contacts 10 closed until normal or full load current is reestablished in conductor 1. The reason that all of coil 9 is not used as a holding coil is because the drop out value of an alternating current electromagnet is much less than its pull in value. In other words the number of ampere turns necessary to close contacts 10 is considerably greater than the number of ampere turns which will just hold them closed. Consequently if all of coil 9 were used as a holding coil contacts 10 would not open until the line current fell far below a safe value.

If the dielectric material of capacitor 7 contains a latent or incipient fault it may break down under normal line conditions. In this event the dielectric failure protective elements will operate as follows: When the dielectric fails the capacitor voltage will drop to substantially zero with the result that contacts 15 will open, thus removing the short circuit from coil 13 with the result that contact 11 will be tripped closed to take the capacitor out of service by short circuiting it. As will be observed, contacts 11 will not be automatically opened if the line current falls to zero, it being necessary to manually rest the contact 11 and tripping mechanism before capacitor 7 can again be put into service after it has been repaired or a new one substituted. The purpose of the time delayed element 18 is to prevent tripping contacts 11 closed when the capacitor is first placed into service.

Another and preferred combined overload and dielectric failure protective equipment is shown applied to a capacitor installation in conductor 2 of the high voltage transmission system. In this installation the capacitor is divided into parallel connected capacitors 7' in order to simplify the dielectric failure protective equipment as a whole. In fact the principal difference between the installations in conductors 1 and 2 is in the details of the dielectric failure protective equipment. This equipment, as such, forms no part of the present invention and it is described and claimed in an application of Thomas A. E. Belt, Serial No. 491,297, filed October 25, 1930, for a protective system for electrical apparatus, which is assigned to the assignee of this application. It is similar to the equipment for capacitor 7 in that a pair of normally open contacts 11' are arranged to be tripped closed by a tripping coil 12' which is energized upon failure of the dielectric of either capacitors 7' but the means for energizing the tripping coil is simpler and less expensive. Thus, all that is required is means such as two differentially connected current transformers 19 and 20 for producing a current which is proportional to a differential current flowing in the parallel capacitor branches when one of the capacitors fails.

The operation is briefly as follows: When both capacitors 7' are in good condition the currents produced in the secondary windings of the current transformers 19 and 20 merely circulate in them and no current flows in the coil 12'. As soon however as the dielectric of one condenser fails the ratio of the primary currents of the current transformers is changed with the result that the secondary winding currents are no longer equal, thus producing a differential current which must flow in the tripping coil 12'. Although not shown, a time delay element may also be added to the arrangement just as in the equipment for capacitor 7.

The overload protective equipment for the installation in conductor 2 differs from that in conductor 1 in that the contacts for short circuiting the spark gap are divided into series connected groups 10' thereby reducing the voltage which group must handle with the result that their life is increased.

I have found however that on low and medium voltage circuits the voltage across the capacitor on short circuit or overload conditions does not rise high enough to permit of satisfactory protection by a spark gap. It is therefore preferable to have the overload protective equipment for capacitors in such circuit current operated instead of voltage operated. Two such equipments are illustrated in Fig. 2. This figure shows a circuit comprising conductors 21 and 22 which connect terminal apparatus 23 and 24 which may be either transmitting or receiving apparatus respectively or vice versa. In conductor 21 is a series capacitor 25. The overload protective equipment for this capacitor comprises a normally open switch or contactor having a pair of normally open contacts 26 and an operating coil 27 which is connected in conductor 21. The contacts 26 are connected across capacitor 25 through a part of coil 27.

The operation of this arrangement is as follows: If overload or short circuit conditions obtain on conductor 21 the increase in current above normal which flows through coil 27 will cause contacts 26 to close and short circuit capacitor 25 and a part of coil 27. The remaining part of coil 27 then acts as a holding coil to maintain the contacts 26 closed until the current in conductor 21 returns to normal. If contacts 26 did not short circuit a part of coil 27 the contacts 26 would not open again until the current in conductor 21 had fallen far below normal full load value.

A modified low voltage overload protective arrangement is shown in connection with a capacitor 25' which is connected in conductor 22. In this arrangement a contactor having normally open contacts 26' has two operating coils, one of which is a coil 28 which is connected in conductor 22 and the other which is a coil 29 connected across condenser 25'.

The operation of this arrangement is as follows: When an overload or short circuit occurs the voltage across capacitor 25' increases, thus increasing the voltage across coil 29. At the same time the current in coil 28 increases. When the current through condenser 25' reaches a dangerously high value the combined action of coils 28 and 29 closes contacts 26', thus short circuiting condenser 25' and coil 29. Coil 28 then acts to hold contacts 26' closed until the current returns to normal.

Although dielectric failure protection has not been shown in connection with capacitors 25 and 25' it will be obvious to those skilled in the art that either of the dielectric failure protective arrangements shown in Fig. 1 could be applied to capacitors 25 and 25' if desired.

In Fig. 3 is shown a simplification and refinement of the high voltage protective equipment for the capacitor installation in conductor 2 of Fig. 1. This consists of using the same sets of contacts for both the overload and dielectric failure protection equipments. Thus, instead of tripping contacts 11 closed, tripping coil 12' acts to trip a pivoted lever 30 which is strongly biased to close contacts 10' by a suitable means such as spring 31. A handle 32 is provided on a lever 30 to facilitate manual resetting. The remaining operation of this modification is the same as the operation of the equipment for protecting the capacitor installation in conductor 2 of Fig. 1.

While I have shown and described particular embodiments of my invention it will be obvious to those skilled in the art that changes and modifications may be made without departing from my invention in the broader aspects and I therefore aim in the appended claims to cover all such changes and modifications that fall within the true spirit and scope of my invention.

What I claim as new and desire to secure by Letters Patent of the United States, is:

1. A capacitor protective system comprising an electric circuit, a capacitor connected in said circuit, means wholly energized from said circuit for short circuiting said capacitor when its voltage exceeds a predetermined value, and additional means wholly energized from said circuit for short circuiting said capacitor upon failure of its dielectric, said last mentioned means including a manual reset.

2. In combination, an electric circuit, an electric condenser connected therein, a current limiting impedance whose value decreases rapidly at a certain critical voltage connected across said condenser, a normally open pair of contacts connected across said condenser, means responsive to a current flow in said impedance for causing engagement of said contacts, and means responsive to a current flow between said contacts which is in excess of a given value for maintaining said contacts closed.

3. In combination, an electric circuit, an electric condenser connected to be energized by said circuit, a protective gap shunting said condenser, a normally open switch shunting said gap, an operating coil for said switch, said coil being connected in series with said gap, and means connecting a fraction of said coil in series with the contacts of said switch so as to form a holding coil.

4. In combination, an electric circuit, an electric condenser connected to be energized by said circuit, a normally open switch connected to shunt said condenser, a tripping magnet arranged when it is energized to trip said switch closed, means for energizing said magnet in accordance with the current flowing in said condenser and means responsive to the voltage across said condenser for short circuiting said tripping magnet.

5. In combination, an electric circuit, an electric condenser connected therein, a normally open switch arranged to shunt said condenser, an operating coil for said switch connected in series with said condenser, one of the contacts of said switch being connected to an intermediate point in said operating coil.

6. In combination, an electric circuit, an electric condenser connected therein, a switch having a pair of normally open contacts connected across said condenser, an actuating coil for closing said switch connected across said condenser and a holding coil for maintaining said switch closed connected in said electric circuit.

7. In a capacitor protective system, a switch, means biasing said switch to open position, a pair of independent operating means for closing said switch, one of said means comprising an electromagnet, the other of said means including biasing means for urging said switch to its closed position, a latch for restraining said last mentioned biasing means, and an electromagnetic trip for said latch.

8. In combination, an alternating current circuit, a series capacitor connected therein, a contactor connected for short circuiting said capacitor, means biasing said contactor open, magnet windings connected to be energized from said circuit in a manner to close said contactor against said biasing means when said capacitor is overloaded, and connections for including a fraction of said windings in series with the contacts of said contactor.

9. In combination, an alternating current circuit, a series capacitor connected therein, a contactor having its contacts connected across said capacitor, means biasing said contactor to its open position, and a pair of operating windings for said contactor, one of said windings being connected to said circuit so as to carry a current which varies in accordance with an overload current carried by said capacitor, the other winding being connected in series with the contacts of said contactor.

10. In combination, an alternating current circuit, a static capacitor connected therein, a normally open contactor having its contacts connected across said capacitor, an operating winding for said contactor connected to cause closure of its contacts whenever an electrical condition of said circuit is above a predetermined value corresponding to an overload on said capacitor, connections completed by the closure of said contactor for incapacitating a plurality of the turns of said operating winding, and a holding winding on said contactor connected to respond to said electrical condition and proportioned to permit opening of said contactor whenever said condition is below said predetermined value, whereby the values of said condition at which said contactor closes and opens are substantially the same.

GUY A. MOFFETT.